(12) United States Patent
Ullrich

(10) Patent No.: US 10,780,565 B2
(45) Date of Patent: Sep. 22, 2020

(54) HOUSING DEVICE FOR A HAND-HELD POWER TOOL

(71) Applicant: Robert Bosch GmbH, Stuttgart (DE)

(72) Inventor: Andre Ullrich, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1254 days.

(21) Appl. No.: 14/749,802

(22) Filed: Jun. 25, 2015

(65) Prior Publication Data

US 2015/0375388 A1    Dec. 31, 2015

(30) Foreign Application Priority Data

Jun. 25, 2014  (DE) .......................... 10 2014 212 157

(51) Int. Cl.
*B25F 5/02*         (2006.01)
(52) U.S. Cl.
CPC ...................... *B25F 5/02* (2013.01)
(58) Field of Classification Search
CPC ................ B25F 5/02; B25B 5/00; H02H 7/10
USPC ........................ 173/217, 216, 176
See application file for complete search history.

(56) References Cited

U.S. PATENT DOCUMENTS

| | | | | |
|---|---|---|---|---|
| 3,530,350 A | * | 9/1970 | Gawron | H02P 23/28 318/400.09 |
| 6,243,276 B1 | * | 6/2001 | Neumann | H02H 5/047 323/901 |
| 6,296,065 B1 | * | 10/2001 | Carrier | B25F 5/02 173/171 |
| 6,536,536 B1 | * | 3/2003 | Gass | B23B 31/123 173/171 |
| 2005/0082920 A1 | * | 4/2005 | Heigl | B25F 5/02 310/50 |
| 2011/0168420 A1 | | 7/2011 | Kobayashi et al. | |

FOREIGN PATENT DOCUMENTS

| | | |
|---|---|---|
| CN | 1260263 A | 7/2000 |
| CN | 201559182 U | 8/2010 |
| DE | 197 16 804 A1 | 10/1998 |
| DE | 102 15 348 A1 | 10/2002 |

* cited by examiner

*Primary Examiner* — Nathaniel C Chukwurah
(74) *Attorney, Agent, or Firm* — Maginot, Moore & Beck LLP

(57) ABSTRACT

A housing device for a hand-held power tool includes at least one receiving interface configured to receive a battery unit. The at least one receiving interface is further configured to receive a mains power connection unit as an alternative to the battery unit.

11 Claims, 5 Drawing Sheets

HOUSING DEVICE FOR A HAND-HELD POWER TOOL

This application claims priority under 35 U.S.C. § 119 to patent application no. DE 10 2014 212 157.4, filed on Jun. 25, 2014 in Germany, the disclosure of which is incorporated herein by reference in its entirety.

BACKGROUND

A housing device for a hand-held power tool, having at least one receiving interface, which is designed to receive a battery unit, has already been proposed.

SUMMARY

The disclosure is based on a housing device for a hand-held power tool, having at least one receiving interface, which is designed to receive a battery unit.

It is proposed that the receiving interface be designed to receive a mains power connection unit as an alternative to the battery unit. Thus, advantageously, the housing device can be produced inexpensively, irrespective of subsequent operation by mains power or subsequent operation by battery. For production, advantageously, it is possible to reduce a quantity of separate, cost-intensive injection molds. It is additionally proposed that the housing device have a latching unit, which is designed for latching the battery unit or, alternatively, for latching the mains power connection unit. The hand-held power tool preferably constitutes a power drill, a percussion drill, a hammer drill or a screwdriver. The battery unit may comprise one battery cell or, advantageously, a plurality of battery cells. Preferably, at least one battery cell constitutes a nickel metal hydride battery or, particularly preferably, a lithium-ion battery. Preferably, the battery unit has a nominal voltage of between 3.6 V and 48 V. Particularly preferably, the battery unit has a nominal voltage of 10.8 V, 14.4 V, 18 V or 36 V. The mains power connection unit is designed, advantageously, for coupling the hand-held power tool to an external mains electric power supply, in particular to an external alternating-current power supply. Advantageously the mains power connection unit has a motor-control electronics unit, which is designed to effect electrical control of the electric motor, in particular an EC motor. Furthermore, advantageously, the mains power connection unit comprises a transformer, for adapting a voltage of the external mains electric power supply to an operating voltage of the hand-held power tool. Furthermore, advantageously, the mains power connection unit comprises a connecting cable and, electrically connected to the connecting cable, a main power connector plug, in particular a single-phase domestic connector plug. Preferably, the mains power connection unit is designed for transforming a mains voltage of between 110 V and 240 V, having a frequency of between 50 Hz and 60 Hz, into a direct voltage of between 5 V and 50 V. A "latching unit" in this context is to be understood to mean, in particular, a unit having at least one latching means, which is designed to be deflected resiliently out of an initial position during an assembly operation, and to be moved resiliently back into the initial position, at least partially, upon attainment of a final assembly position. Preferably, the latching unit comprises at least one latching recess corresponding to the at least one latching means. "Designed" is to be understood to mean, in particular, specially configured and/or equipped. That an object is designed for a particular function, is to be understood to mean, in particular, that the object fulfils and/or performs this particular function in at least one application state and/or operating state.

In a further design of the disclosure, it is proposed that the receiving interface have at least one fastening means, which is designed for inseparable coupling to the mains power connection unit prior to an initial operation. It is thereby possible, advantageously, to prevent unwanted removal of the mains power connection unit from the receiving interface. Furthermore, advantageously, a final assembly operation may optionally be effected in a production line or by an end customer. Preferably, the at least one fastening means is constituted by a latching means.

Further, it is proposed that the housing device comprise at least one electric-motor bearing unit, which is designed to mount at least two electric motors of differing design. For this purpose, the electric-motor bearing unit may have bearing shells of differing shape that are integral with a main housing body of the housing device. Preferably, however, the electric-motor bearing unit is realized as a component that is separate from the main housing body. The main housing body preferably constitutes a housing shell. The electric motor is constituted by a universal electric motor, a DC motor or, preferably, by an EC motor.

Furthermore, it is proposed that the at least one electric-motor bearing unit comprise at least one electric-motor bearing adapter, which is designed to alter a geometry of an electric motor. Any electric motor, from a selection of electric motors of differing dimensions, can thus be mounted on the housing device with little assembly work. Advantageously, the electric-motor bearing adapter is designed to alter a length of an electric motor and/or a diameter of an electric motor. Further, it is proposed that the housing device comprise at least one operating-switch bearing unit, which is designed to mount at least two operating switches of differing design. Any operating switch, from a selection of operating switches of differing dimensions, can thus be mounted on the housing device with little assembly work. The operating-switch bearing unit may be realized so as to be separate from the main housing body. Particularly advantageously, the operating-switch bearing unit is integral with the main housing unit. The operating switch is designed, advantageously, to change an operating state of a hand-held power tool.

Furthermore, it is proposed that the housing device comprise at least one rotational-direction switch bearing unit, which is designed to mount at least two rotational-direction switches of differing design. Any rotational-direction switch, from a selection of rotational-direction switches of differing dimensions, can thus be mounted on the housing device with little assembly work. The rotational-direction switch bearing unit may be realized so as to be separate from the main housing body. Particularly advantageously, the rotational-direction switch bearing unit is integral with the main housing unit. The rotational-direction switch is designed, advantageously, to change a direction of rotation of an insert tool of a hand-held power tool.

Additionally proposed is a system having a hand-held power tool, and having a battery unit coupled to the receiving interface. The system, advantageously, can be produced in a structurally simple and inexpensive manner.

Additionally proposed is a system having a hand-held power tool, and having a mains power connection unit coupled to the receiving interface. The system, advantageously, can be produced in a structurally simple and inexpensive manner.

Further, it is proposed that the mains power connection unit comprise a motor-control electronics unit, which is designed to effect electrical control of an electric motor. Thus, particularly advantageously, the motor-control electronics unit can be disposed outside of the housing device. The motor-control electronics unit can be of advantageously greater dimensions. As a result, the motor-control electronics unit can easily be adapted to higher voltages and/or electric currents, without the necessity of altering the housing device. In addition, it is proposed that the motor-control electronics unit be designed to adapt an external voltage to an operating voltage of the hand-held power tool.

The housing device according to the disclosure is not intended in this case to be limited to the application and embodiment described above. In particular, for the purpose of fulfilling a mode of functioning described herein, the housing device according to the disclosure may have a quantity of individual elements, components and units that differs from a quantity stated herein.

BRIEF DESCRIPTION OF THE DRAWINGS

Further advantages are disclosed by the following description of the drawing. The drawing shows an exemplary embodiment of the disclosure. The drawing, the description and the claims contain numerous features in combination. Persons skilled in the art will expediently also consider the features individually and combine them to form appropriate further combinations.

In the Drawings.

DETAILED DESCRIPTION

Figure 1:
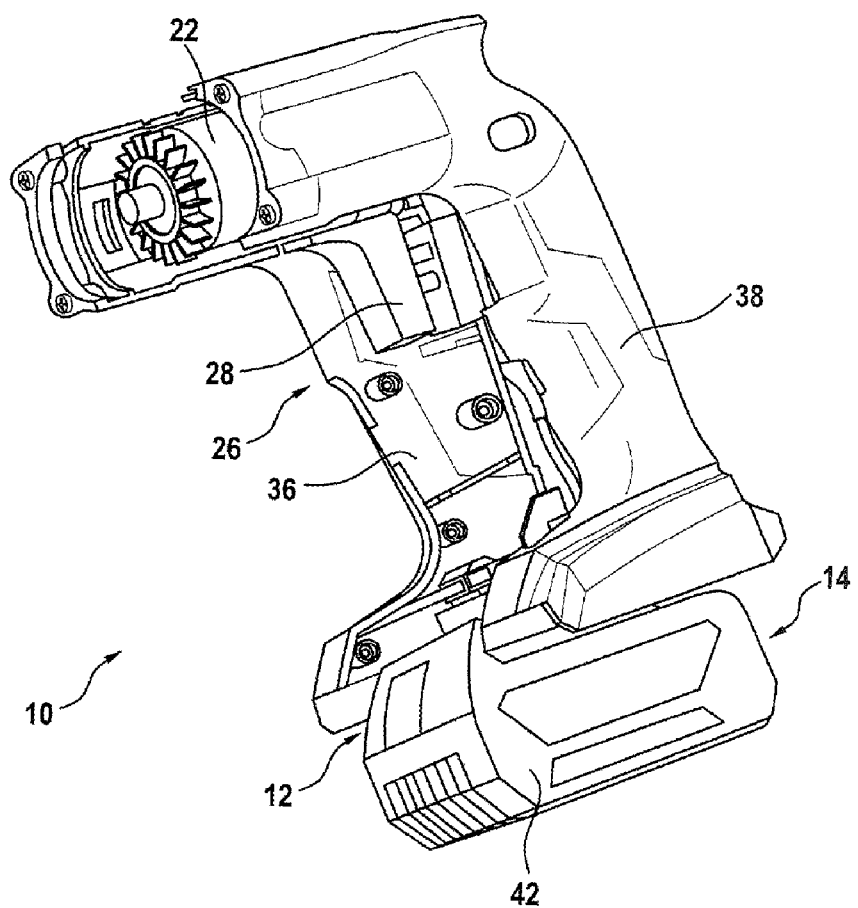
FIG. 1 shows a hand-held power tool having a housing device, in a perspective, exploded representation.
Figure 2:
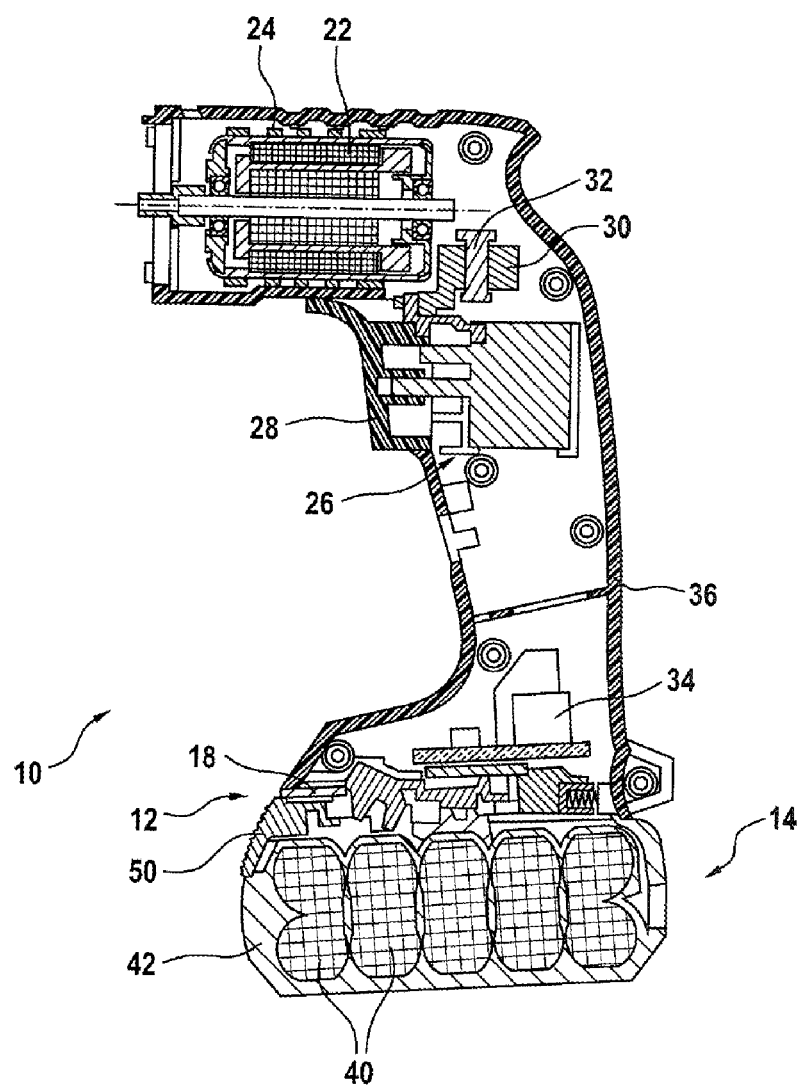
FIG. 2 shows the housing device according to FIG. 1 having a battery unit, in a sectional representation.

A hand-held power tool 10, having a housing device, is shown in FIGS. 1 and 2. The hand-held power tool 10 constitutes a power drill. For reasons of clarity, a transmission unit and a drill chuck are not represented. The housing device has two main housing bodies 36, 38. It is also conceivable in this context for the housing device to have further main housing bodies. The main housing bodies 36, 38 each constitute a housing shell. The main housing bodies 36, 38 are realized as plastic injection-molded parts. The main housing bodies 36, 38 are designed to receive an electric drive train. During an assembly operation, the main housing bodies 36, 38 are fitted together, ad form a, insofar as possible closed, receiving space for the electric drive train.

The electric drive train comprises an electric motor 22, an operating switch 28, a rotational-direction switch 32, and a continuous-operation switch, which is not shown in greater detail. The electric motor 22 is constituted by an EC motor. The operating switch 28 is designed to set a rotational speed of the electric motor 22. The rotational-direction switch 32 is designed to set a direction of rotation of the electric motor 22. The continuous-operation switch is designed to activate continuous operation of the electric motor 22, in particular by latching the operating switch 28 in an operating position.

The hand-held power tool 10 shown in FIG. 2 has a motor-control electronics unit 34. The motor-control electronics unit 34 can be coupled to a battery unit 14. The motor-control electronics unit 34 is designed to set the rotational speed and the direction of rotation of the electric motor 22. The motor-control electronics unit 34 is disposed inside the housing device.

The battery unit 14 comprises a plurality of battery cells 40. The battery cells 40 are constituted by lithium-ion battery cells. The battery cells 40 are combined in a battery cell block. A battery housing 42 in this case encloses the battery cells 40. The housing device has a receiving interface 12. The receiving interface 12 is designed to receive the battery unit 14. For this purpose, the battery housing 42 realizes a coupling region for coupling to the receiving interface 12. The receiving interface 12 is designed for supplying energy to the housing device.

In FIGS. 1 and 2, the battery unit 14 is coupled to the receiving interface 12. More precisely, the battery unit 14 is separably coupled to the receiving interface 12. The battery unit 14 realizes an interchangeable battery unit. The housing device in this case has a latching unit, not shown in greater detail, which is designed for latching the battery unit 14. The battery unit 14 has an actuating element 50. The actuating element 50 is designed to release the latching of the latching unit.

Figure 3:
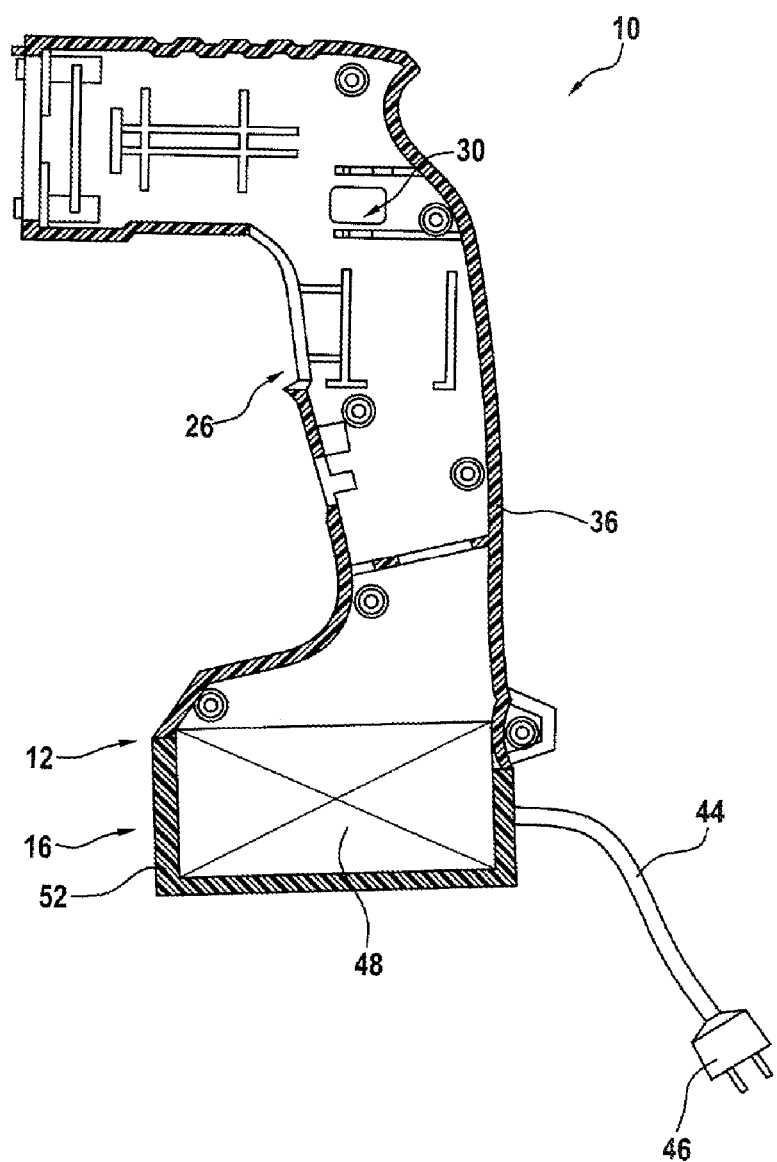
FIG. 3 shows the housing device according to FIG. 1 having a mains power connection unit, in a sectional representation.

As shown in FIG. 3, the receiving interface 12 is designed to receive the mains power connection unit 16 as an alternative to the battery unit 14. The mains power connection unit 16 is designed to couple the hand-held power tool 10 to an external alternating-current mains power supply. The mains power connection unit 16 realizes a housing extension of the housing device. The mains power connection unit 16 comprises a motor-control electronics unit 48, which is designed to effect electrical control of the electric motor 22. The motor-control electronics unit 48 is provided instead of the motor-control electronics unit 34 shown in FIG. 2. The motor-control electronics unit 48 is of greater dimensions that the motor-control electronics unit 34 shown in FIG. 2. In this context, it is also conceivable, in principle, for both the hand-held power tool 10 and the mains power connection unit 16 to have a motor-control electronics unit 34, 48.

The mains power connection unit 16 additionally comprises a transformer, not shown in greater detail, for adapting a voltage of the external alternating-current mains power supply to an operating voltage of the hand-held power tool 10. The mains power connection unit 16 additionally comprises a connecting cable 44. Disposed at a free end of the connecting cable 44 there is a single-phase domestic connector plug 46, for coupling to a domestic socket outlet, not shown in greater detail. The mains power connection unit 16 comprises an electronics housing 52. The electronics housing 52 has a geometry that is at least substantially the same as the battery housing 42. The transformer and further electronic elements that are necessary for operation by mains power are disposed inside the electronics housing 52. It is also conceivable in this context for the mains power connection unit 16 not to have a transformer.

The receiving interface 12 has a fastening means 18, which is designed for inseparable coupling to the mains power connection unit 16 prior to an initial operation. The fastening means 18 is constituted by a latching means of the latching unit. The mains power connection unit 16 does not comprise any actuating element for releasing the latching of the latching unit. In this context, it is also conceivable, in principle, for the mains power connection unit 16 to have an actuating element for releasing the latching of the latching unit. In this case, the mains power connection unit 16 could be realized so as to be separable from the receiving interface 12.

The housing device comprises an operating-switch bearing unit 26. Depending on whether operation is by battery or by mains power, operating switches 28 of differing designs may be required. To enable the same housing device to be used in each case, the operating-switch bearing unit 26 is designed to mount the operating switches 28 of differing design. The operating-switch bearing unit 26 is integral with the main housing bodies 36, 38. The operating-switch bearing unit 26 has differing holding indentations, not shown in greater detail, which are designed to receive operating switches 28 of differing sizes.

In manner similar to this, the housing device comprises a rotational-direction switch bearing unit 30, which is designed to mount the rotational-direction switches 32 of differing design. The rotational-direction switch bearing unit 30 is integral with the main housing bodies 36, 38. The rotational-direction switch bearing unit 30 has differing holding indentations, not shown in greater detail, which are designed to receive rotational-direction switches 32 of differing sizes.

Depending on whether operation is by battery or by mains power, electric motors 22 of differing structural sizes may be required. The structural size of the electric motors 22 depends, inter alia, on differing windings of the electric motors 22. In order to receive electric motors 22 of differing structural size, the housing device comprises an electric-motor bearing unit 20. The electric-motor bearing unit 20 is designed to mount electric motors 22 of differing designs. The electric-motor bearing unit 20 is realized as a component that is separate from the main housing bodies 36, 38.

Figure 4:
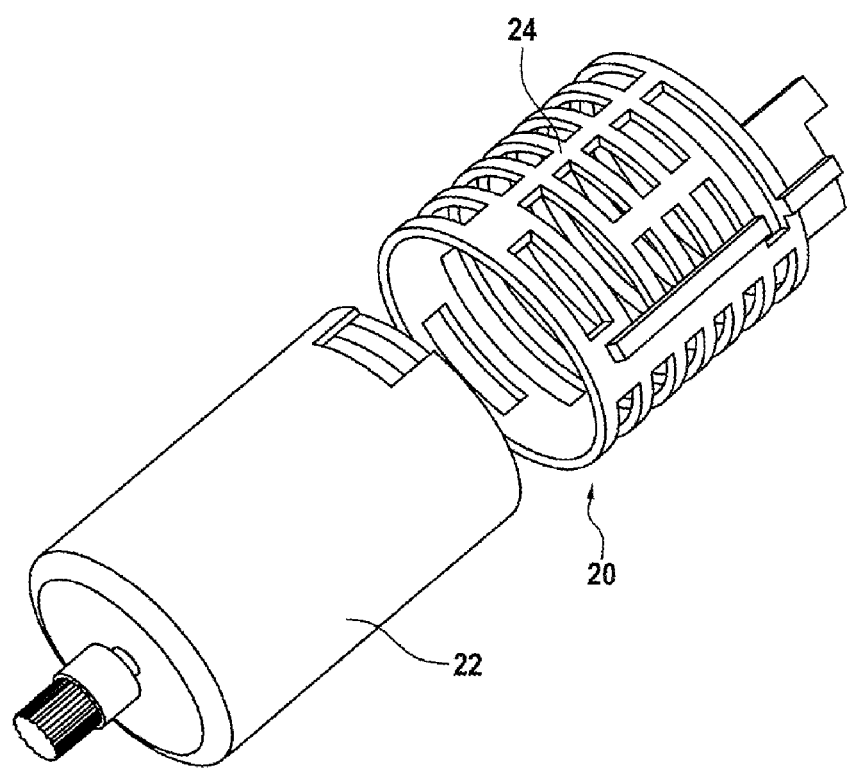
FIG. 4 shows an electric-motor bearing unit and an electric motor, in a perspective representation.
Figure 5:
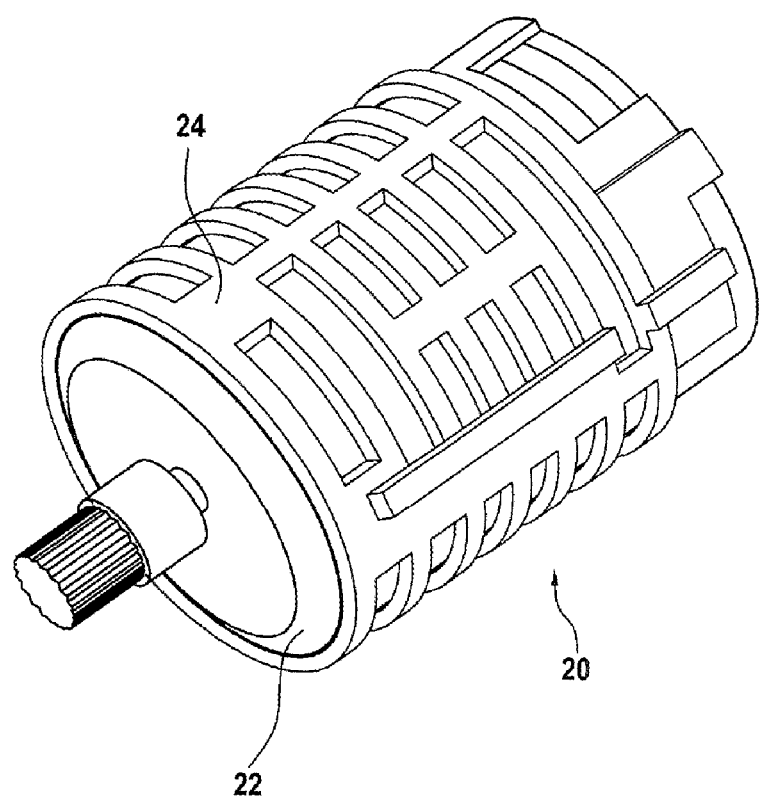
FIG. 5 shows the electric-motor bearing unit and the electric motor according to FIG. 4, in a further perspective representation.

As shown in FIGS. 4 and 5, the electric-motor bearing unit 20 comprises an electric-motor bearing adapter 24. The electric-motor bearing adapter 24 is designed to alter a geometry of an electric motor. The electric-motor bearing adapter 24 is designed to alter a diameter of an electric motor. The electric-motor bearing adapter 24 realizes a grating structure in the shape of a hollow cylinder. The electric motor 22 shown in FIG. 4 is of too small a diameter to be mounted in the housing device. As shown in FIG. 5, the electric-motor bearing adapter 24, when in a mounted stated, has been pushed on to the electric motor 22, and enlarges the diameter of the electric motor 22. The electric-motor bearing adapter 24 additionally has a geometric coding, which enables unambiguously assignable positioning within the housing device.

What is claimed is:

1. A housing device for a hand-held power tool, comprising:
    at least one receiving interface configured to separably couple to a battery unit and to receive a mains power connection unit as an alternative to the battery unit, the at least one receiving interface including at least one fastening member configured to inseparably couple to the mains power connection unit.

2. The housing device according to claim 1, wherein the at least one fastening member is configured to inseparably couple to the mains power connection unit prior to an initial operation of the hand-held power tool.

3. The housing device according to claim 1, further comprising at least one electric-motor bearing unit configured to mount at least two electric motors that each have different designs.

4. The housing device according to claim 3, wherein the at least one electric-motor bearing unit includes at least one electric-motor bearing adapter configured to alter a geometry of an electric motor.

5. The housing device according to claim 1, further comprising at least one operating-switch bearing unit configured to mount at least two operating switches that each have a different design.

6. The housing device according to claim 1, further comprising at least one rotational-direction switch bearing unit configured to mount at least two rotational-direction switches that each have a different design.

7. A hand-held power tool, comprising:
    a housing device that includes:
        at least one receiving interface configured to receive a battery unit and to receive a mains power connection unit as an alternative to the battery unit; and
        at least one electric-motor bearing unit configured to mount at least two electric motors that each have different designs.

8. A system, comprising:
    a hand-held power tool, including:
        a housing device having:
            at least one receiving interface configured to receive a battery unit and to receive a mains power connection unit as an alternative to the battery unit; and
            at least one operating-switch bearing unit configured to mount at least two operating switches that each have a different design.

9. The system according to claim 8, wherein the battery unit is separably coupled to the at least one receiving interface of the housing device of the power tool.

10. The system according to claim 8, wherein the mains power connection unit is inseparably coupled to the at least one receiving interface of the housing device of the power tool.

11. The system according to claim 10, wherein the mains power connection unit includes a motor-control electronics unit configured to effect electrical control of an electric motor.

* * * * *